(12) United States Patent
Wine et al.

(10) Patent No.: US 10,520,795 B2
(45) Date of Patent: Dec. 31, 2019

(54) QUICK COUPLING FOR BODY CAMERA

(71) Applicant: Axon Enterprise, Inc., Scottsdale, AZ (US)

(72) Inventors: Jason Wine, Kenmore, WA (US); Andrew Ambach, Bremerton, WA (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 0 days.

(21) Appl. No.: 16/160,758

(22) Filed: Oct. 15, 2018

(65) Prior Publication Data

US 2019/0113828 A1    Apr. 18, 2019

Related U.S. Application Data

(60) Provisional application No. 62/571,853, filed on Oct. 13, 2017, provisional application No. 62/571,873, filed on Oct. 13, 2017.

(51) Int. Cl.

| | |
|---|---|
| *G03B 17/56* | (2006.01) |
| *A44B 99/00* | (2010.01) |
| *A45F 5/02* | (2006.01) |
| *F16M 13/04* | (2006.01) |
| *F16B 2/12* | (2006.01) |
| *B60R 11/00* | (2006.01) |
| *B60R 11/04* | (2006.01) |
| *F16B 21/04* | (2006.01) |

(52) U.S. Cl.
CPC .......... *G03B 17/561* (2013.01); *A44B 99/005* (2013.01); *A45F 5/02* (2013.01); *F16B 2/12* (2013.01); *F16M 13/04* (2013.01); *G03B 17/566* (2013.01); *A45F 2200/0533* (2013.01); *B60R 11/04* (2013.01); *B60R 2011/0078* (2013.01); *F16B 21/04* (2013.01)

(58) Field of Classification Search
USPC ................................. 396/419, 420; 248/187.1
See application file for complete search history.

(56) References Cited

U.S. PATENT DOCUMENTS

| | | | | |
|---|---|---|---|---|
| 2,190,555 A | * | 2/1940 | Toce | G07F 17/248 |
| | | | | 403/259 |
| 2,723,430 A | * | 11/1955 | Paillard | A45C 11/38 |
| | | | | 24/369 |
| 3,768,064 A | * | 10/1973 | Pabich | H04N 5/64 |
| | | | | 439/370 |

(Continued)

*Primary Examiner* — Clayton E. LaBalle
*Assistant Examiner* — Warren K Fenwick
(74) *Attorney, Agent, or Firm* — Andrew Graham (57) ABSTRACT

A coupling releasably secures an item such as a body camera to a mount point. The coupling includes a connector and a receiver. The connector includes a crossbar and a post. The receiver includes an opening and a slot. The crossbar moves through the entry opening and the connector is rotated relative to the receiver. The post of the connector is moved through the slot to engage the receiver and hold the connector in a mounted position on the receiver, thereby securing the item to the mount point. Embodiments of the present disclosure also involve methods for securing the item to the mount point using a connector and receiver, as well as systems for mounting an item using a connector, receiver, and mount point.

20 Claims, 3 Drawing Sheets

(56) References Cited

U.S. PATENT DOCUMENTS

| | | | | |
|---|---|---|---|---|
| 3,827,068 | A * | 7/1974 | Hill, Jr. | G03B 37/005 |
| | | | | 396/19 |
| 4,948,311 | A * | 8/1990 | St. Pierre | B60P 7/0807 |
| | | | | 248/499 |
| 5,053,794 | A * | 10/1991 | Benz | G02B 7/00 |
| | | | | 359/819 |
| 6,585,465 | B1 * | 7/2003 | Hammond | B60P 7/0815 |
| | | | | 410/104 |
| 7,401,995 | B2 * | 7/2008 | Senakiewich, II | B60P 7/0815 |
| | | | | 403/374.4 |
| 7,693,418 | B2 * | 4/2010 | Lloyd | G03B 17/566 |
| | | | | 248/690 |
| 8,730,388 | B2 * | 5/2014 | Osborn | H04N 5/2258 |
| | | | | 348/373 |
| D763,057 | S | 8/2016 | Soper et al. | |
| D763,058 | S | 8/2016 | Soper et al. | |
| 9,671,060 | B1 * | 6/2017 | Cifers | F16M 13/02 |
| 9,879,819 | B1 * | 1/2018 | Cifers | F16M 13/02 |
| 10,413,046 | B2 | 9/2019 | Hanchett et al. | |
| 2012/0173732 | A1 * | 7/2012 | Sullivan | G06F 1/1607 |
| | | | | 709/226 |
| 2015/0254199 | A1 * | 9/2015 | Sullivan | G06F 13/385 |
| | | | | 710/12 |
| 2016/0316900 | A1 * | 11/2016 | Hanchett | A45F 5/02 |
| 2018/0065430 | A1 * | 3/2018 | McCall | B60D 1/01 |
| 2018/0344015 | A1 * | 12/2018 | Hanchett | A45F 5/02 |

\* cited by examiner

QUICK COUPLING FOR BODY CAMERA

CROSS REFERENCE TO RELATED APPLICATIONS

This application claims the benefit of Provisional Patent Application Ser. No. 62/571,853, filed on Oct. 13, 2017 and Provisional Patent Application Ser. No. 62/571,873, filed on Oct. 13, 2017, to which priority is claimed pursuant to 35 U.S.C. § 119(e), and which are both incorporated herein by reference in their entireties. This application is also related to Non-Provisional patent application Ser. No. 16/161,000, filed Oct. 15, 2018, which is also incorporated by reference in its entirety.

BACKGROUND OF THE INVENTION

Embodiments according to various aspects of the present disclosure relate to a coupling that enables an item to be quickly connected to and disconnected from a mount point. The connection of the item to the mount point is sufficiently secure that the item cannot inadvertently be removed from the mount point; instead, deliberate sequential movements to at least two to three directions are required. Currently there is in use no easy quick and reliable mounting method that allows this operation for products such as body cameras.

BRIEF SUMMARY OF INVENTION

This summary is provided to introduce a selection of concepts in a simplified form that is further described below in the detailed description. This summary is not intended to identify key features of the claimed subject matter, nor is it intended to be used as an aid in determining the scope of the claimed subject matter.

In some embodiments according to various aspects of the present disclosure, couplings for releasably securing a body camera to a mount point are provided. The couplings comprise a connector that is fixed on the body camera, and a receiver that is fixed on the mount point. The connector has a generally T-shaped configuration including a post and a crossbar. The receiver has an entry opening, a receiver chamber, and a slot. The connector is engageable with the receiver by moving the crossbar though the entry opening and into the receiver chamber, rotating the connector relative to the receiver, and moving the post along the slot to frictionally engage parts on the receiver and hold the connector in a mounted position on the receiver.

In some embodiments, coupling systems are provided. The coupling systems comprise a body camera, a mount point, a connector fixed to one of the body camera and the mount point, and a receiver fixed to the other of the body camera and the mount point. The connector includes a post and a crossbar. The receiver includes an entry opening in communication with a slot. The connector is configured to engage with the receiver by moving the crossbar though the entry opening, rotating the connector relative to the receiver, and moving the post along the slot to engage the receiver and hold the connector in a mounted position on the receiver.

In some embodiments, methods of releasably securing a body camera to a mount point using a connector that is fixed on the body camera and a receiver that is fixed on the mount point are provided. The connector includes a post and a crossbar. The receiver includes an entry opening and a slot. The method comprises moving the crossbar of the connector through the entry opening to engage the receiver. The method further comprises rotating the connector relative to the receiver after the crossbar is moved through the entry opening. The method also comprises, after rotating the connector, moving the post along the slot to engage the receiver and hold the connector in a mounted position on the receiver, thereby securing the body camera to the mount point.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In embodiments according to various aspects of the present disclosure, a coupling of the present invention can be used to releasably connect a body camera to a mount point such as an officer's uniform or a docking station. The coupling includes a first part (or "connector") and a second part (or "receiver"). Each part may involve physically separate, but connectable, structures. The connector may be on an item to be mounted. The receiver may be on the mount point. Similar or identical receivers can be located in different places; when that is done, an item (such as a camera) having a connector on it can be securely and releasably connected to any receiver at any mount point (such as a uniform, helmet, or docking station). A mount point may include a structure that is stationary and/or physically larger than an item to be mounted.

Embodiments according to various aspects of the present disclosure relate to a coupling for releasably securing a body camera to a mount point, the coupling comprising a connector that is fixed on the body camera, and a receiver that is fixed on the mount point. The connector may have a T-shaped configuration including a post and a crossbar. The receiver has an entry opening, a receiver chamber, and a slot. The connector is releasably engageable with the receiver by moving the crossbar though the entry opening and into the receiver chamber, rotating the connector relative to the receiver, and moving the post along the slot to frictionally engage parts on the receiver and hold the connector in a mounted position on the receiver. Frictionally engaged components may be held in a position relative to each other based on a frictional force.

Embodiments according to various aspects of the present disclosure enable an item, such as a body camera, to be quickly and easily connected to and disconnected from a mount point. Embodiments of the invention are applicable to couplings of varying constructions.

Figure 1:
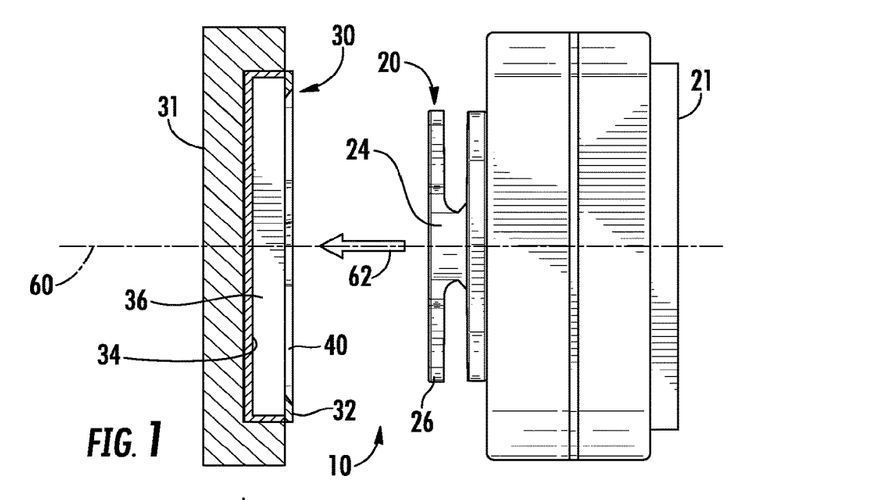
FIG. 1 is a schematic illustration, partially in section, showing an example embodiment of a system according to various aspects of the present disclosure.

Representative of a first example embodiment, FIG. 1 illustrates a coupling 10. The coupling 10 includes two parts—a connector 20 and a receiver 30. A connector is the part of a coupling that fixedly attaches to an item, such as a camera, that is to be secured at a mount point. For example, connector 20 is the part of the coupling 10 that fixedly attaches to the item (such as the camera shown schematically at 21) that is to be secured at a mount point.

A receiver is a part of a coupling to which a connector is securely, yet releasably attached. For example, receiver 30 is the part of the coupling 10 that fixedly attaches to the mount point (such as a docking station or a uniform, indicated schematically at 31) and that receives the connector 20. A connector may be selectively attached and detached from a receiver upon application of a predetermined sequence of relative motions between the connector. A connector may include a first end configured for connecting to an item and a second end configured for connecting to a receiver.

The example, particular connector 20 that is shown in the illustrated embodiment includes a base plate 22 that is secured to the camera 21, for example, by a number of screws (not shown). A central post 24 projects from the base plate in a direction away from the camera 21. The post 24 has a right cylindrical configuration.

At its outer end, the post 24 supports a crossbar 26. The crossbar 26 is a thin plate that extends perpendicular to the length of the post 24, in two diametrically opposite directions from the post 24. As a result, the connector 20 including the post 24 and the crossbar 26 has a generally T-shaped configuration when viewed from the side as in FIG. 1.

Other shapes may also be employed for a crossbar, including those in which only one portion of a plate extends perpendicular to the length of the post, three or more portions of a plate extends perpendicular to the length of the post, and/or portion(s) of a plate extend symmetrically, asymmetrically, equally, or unequally from a center axis of the post. A width of the thin plate may be at least three times greater than a width of the post in the same plate, such as generally shown in FIG. 1. In order to maintain a low profile for a coupling, a post may have a length equal or approximately equal to a thickness of the crossbar in the same direction. For example, a length of post 24 is approximately equal to a thickness of crossbar 26 along direction 62 as shown in FIG. 1. A width of the thin plate may be at least three times greater than a width of the post in the same plane, such as shown for each component in a direction perpendicular to axis 60 illustrated in FIG. 1. Such relative dimensions may enable a connector to be securely and stably coupled with a receiver.

The receiver 30 is adapted or configured, in a manner not shown, to be connected to or otherwise physically associated with the mount point 31 for the camera 21. A mount point may be an object that is stationary and/or larger than an item to be mounted on the mount point via a coupling.

In the illustrated embodiment, the receiver 30 is a generally flat part that has parallel outer and inner wall panels 32 and 34 defining between them a receiver chamber 36. A thickness of the receiver chamber 36, as measured in a direction between the two wall panels, is slightly greater than a thickness of the crossbar 26; as a result, the crossbar is movable in the receiver chamber.

The outer wall panel 32 of the receiver 30 has an entry opening 40 that is similar in configuration to the crossbar 26. The opening may be an elongated opening, at least twice as long in a first direction than it is wide in a perpendicular, second direction. The entry opening 40 communicates with (opens into) the receiver chamber 36. The entry opening 40 is slightly larger than the crossbar 26, so that the crossbar can be inserted into and through the entry opening and thus moved into the receiver chamber 36.

The receiver chamber 36, underneath and adjacent to adjacent the entry opening 40, is wide enough for the crossbar 26 to rotate within the receiver chamber 36. A receiver chamber may at least provide a space for a portion of a connector to rotate. A receiver chamber may be open to a space external to the receiver via one or more additional openings (not shown), aside from an entry opening for a connector. For example, openings instead of one or more walls around a perimeter of a receiver may be provided, connecting a receiver chamber to an area external to the receiver. In embodiments, a receiver may at least include an outer wall panel in which an entry opening is provided. An inner surface of a receiver chamber may be alternately provided by a surface of a mount point, for example, rather than a second wall panel of a receiver.

In embodiments, a block may be provided in the receiver. If provided, a direction of rotation of the crossbar 26 in the receiver chamber 36 is limited and controlled by a block 42 or other structure. The block 42 may be located in the receiver, between the two wall panels 32 and 34. The block 42 is adjacent a slot along a direction parallel to axis 60. Block 42 is shown to the immediate left of one wall 52 of a slot 54 in FIG. 3, though the block may be positioned at another location about and adjacent the slot to limit rotation and movement of the connector. The block 42 may be provided on a side of an outer panel wall. The block 42 may be provided on a side of an outer panel wall opposite from a side of the same outer panel wall in which a connector is first inserted into the outer panel wall. The block 42 ensures that the crossbar 26 can rotate in only one direction immediately after being inserted into the receiver chamber 36 through the entry opening 40.

Two elongate walls 52 in the receiver chamber 36 define between them a slot 54. The entry opening 40 in the outer wall panel 32 communicates with the slot 54. The walls 52 and thus the slot 54 extend away from the entry opening 40, in a direction along the length of the receiver 30. Such walls may comprise at least one surface angled away from a middle of the slot along an elongated length of the slot.

Figure 4:
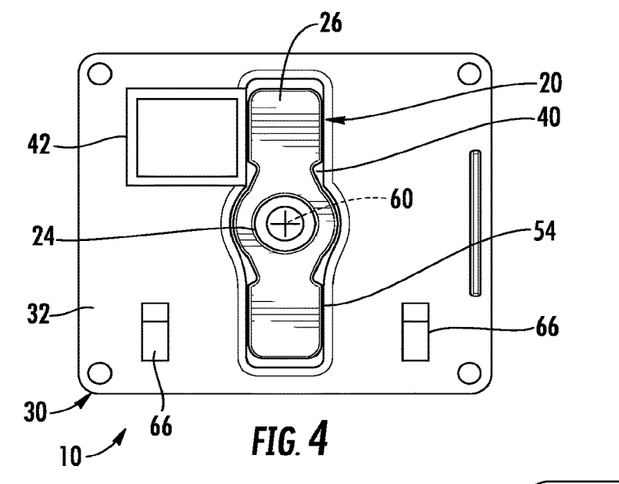
FIG. 4 is a schematic view illustrating the parts of an example embodiment of a coupling in an engaged position according to various aspects of the present disclosure.

In the illustrated example, to mount the camera 21 on the mount point 31, the assembled connector 20 and camera 21 are moved toward the entry opening 40 of the receiver 30, in a direction generally perpendicular to the plane of the receiver, along an axis 60 as indicated by the arrow 62 in FIG. 1. The connector 20 is oriented (rotationally about its central post 24) in a manner so that the crossbar 26 is aligned with the entry opening 40, that is, the length of the crossbar fits within the length of the entry opening. The crossbar 26 enters into the entry opening 40 and is further moved in the direction 62 until the crossbar 26 is below the outer wall panel 32 of the receiver 30, that is, within the receiver chamber 36 (FIG. 4). The crossbar and post enter to the entry opening at an initial orientation relative to the receiver. The crossbar and post enter the entry opening at an initial rotational angle relative to other angles of rotation through which the crossbar and post may be subsequently turned about an axis of rotation.

Figures 2, 3:
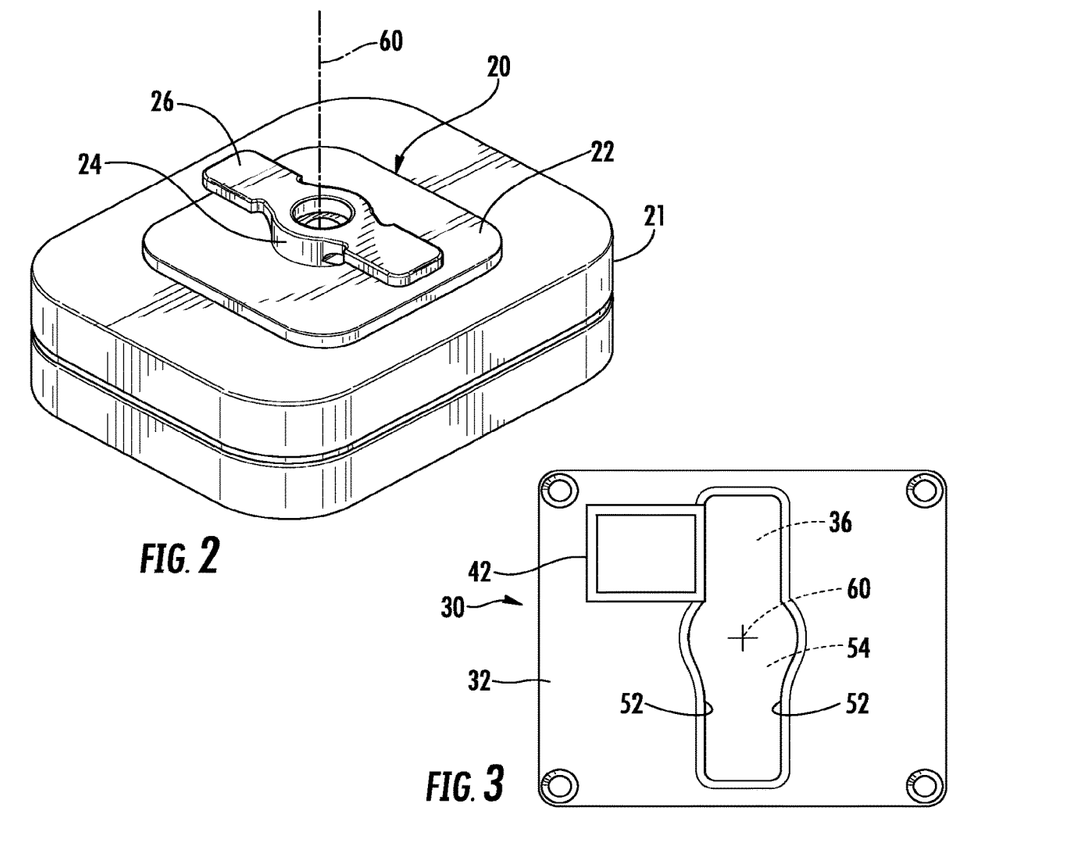
FIG. 2 is a schematic illustration of an example embodiment of a connector according to various aspects of the present disclosure.
FIG. 3 is a plan view of an example embodiment of a receiver according to various aspects of the present disclosure.

A block may comprise a physical protrusion. A block may extend or protrude from a surface of a panel wall. A location of the block may be selected to prevent rotation of the connector in a rotational direction. A size, shape, and surface strength of the block may be selected to prevent rotation of the connector in a rotational direction. A block may be positioned adjacent a slot. For example, block 42 is adjacent slot 54 as illustrated in FIG. 3. The prevented direction of rotation may be opposite a first rotational direction in which rotation of the connector is intended. The prevented direction of rotation may be opposite a first rotational direction in which rotation of the connector may be executed after the connector is first received into the receiver. A block may be integrated on a surface of an outer wall panel of a receiver, on a surface of an inner wall panel of a receiver, or interconnected between two wall panels in a receiver. A block may alternately or additionally be positioned inside a receiver chamber, though other locations designed to engage other positions on a rotatable connector may be employed. A block may be configured to physically engage a connector, such as at a crossbar or the connector, thereby preventing rotation of the connector in the direction of the block.

A block may prevent rotation of a connector within a range of rotational angles relative to an axis of rotation of a connector. For example, rotation of a connector may be prevented in a ninety-degree range of rotational angles. A wing, crossbar, or other portion of a connector may be prevented from physically rotating within this range of rotational angles. Different parts of a crossbar may engage a block, thereby imposing a precluded range of rotational angles for the connector. A precluded range of rotational angles prevents the connector from rotating into the range from either rotational direction into the range. A precluded range of rotational angles may involve a block configured to prevent different portions of a connector from rotating into the range from either rotational direction into the range. A range of rotational angles precluded by a block may prevent different portions of a connector from rotating beyond a predetermined angle of rotation relative to an initial angle at which rotation of the connector may be provided in a receiver.

FIG. 4 illustrates an example initial angle for a connector. The initial angle corresponds to an angle at which the connector is first received by the receiver. Particularly, the initial angle corresponds to an angle about axis 60 at which a crossbar 26 is inserted into slot 54. A slot receives a connector, including a crossbar and post, at an initial orientation relative to components of the receiver. As illustrated, an extended part of a plate forming the crossbar is provided at a vertical angle in FIG. 4, relative to the post 24 and the center axis 60 of the connector. In this example embodiment, post 24 and crossbar 26 have an orientation relative to receiver 30 in which the post 24 and crossbar 26 are aligned with the opening 40 and slot 54. As shown in FIG. 4, both elongated portions of slot 54 and crossbar 26 are oriented in a same vertical direction. After being received at an initial angle, the connector may be subsequently rotated to other angles of rotation, such as illustrated in FIG. 5.

For example, the assembled camera 21 and connector 20 are rotated ninety degrees relative to the receiver 30, about the axis 60 after insertion of crossbar 26 and stem 24 into opening 40. This rotation can occur only in one direction, because the block 42 inside the receiver 30 engages the crossbar 26 to prevent rotation in the opposite direction. Rotation in this direction is further prevented beyond about ninety degrees. Overall rotation of crossbar 26 is prevented from rotation within a range of rotational angles corresponding to ninety degrees about an axis 60 of rotation in the example embodiment of FIG. 6. Both extensions of the thin plate forming crossbar 26 are prevented from entering this range of rotational angles. Engagement between the block and each extension of the crossbar defines a range of precluded or prevented angles of rotation. As such, the block 42 itself prevents rotation within a range of angles in an upper left quadrant of a full range of rotational angles about axis 60. Block 42 is not positioned in other quadrants about axis 60, thereby permitting a crossbar to rotate and/or move laterally through these other quadrants. For example, a crossbar rotates through one other quadrant, moves only laterally through another of these quadrants, and both rotated and moves laterally through the other quadrant. A connector is able to be moved or rotated through the quadrants based on a shape of the connector and slot, as well as a relative position of a block.

Because crossbar 26 extends in two directions, one hundred and eighty-degrees apart, the block and crossbar collectively prevent the connector from rotating beyond more than ninety degrees from an initial angle in which connector is inserted into and received by the receiver. A maximum angle of rotation for the connector is ninety-degrees in the example of FIGS. 4-6. While the block is illustrated as positioned inside a receiver chamber in FIGS. 4-6, a block may also be positioned at other locations on a receiver to engage the connector and prevent rotation of the connector. For example, an additional or alternate block may be positioned on an outer surface of an outer wall panel of a receiver, shaped, located, and otherwise configured to engage a different portion of a connector.

Figure 5:
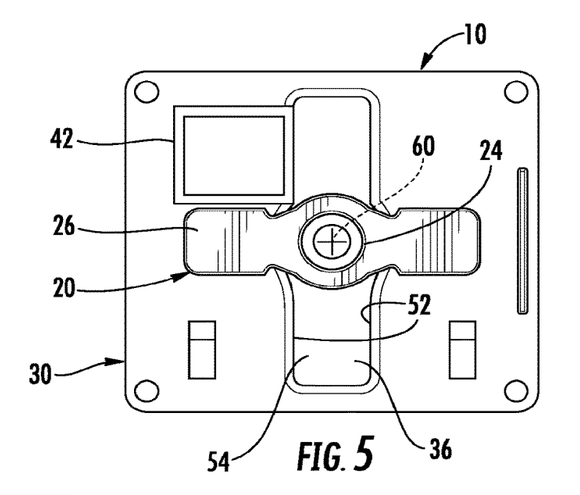
FIG. 5 is a view similar to FIG. 4 illustrating the parts of the example embodiment of the coupling in a rotated position according to various aspects of the present disclosure.

Between FIGS. 4 and 5, the crossbar 26 rotates ninety degrees within the receiver chamber 36, between the two wall panels 32 and 34 of the receiver 30. During this rotational movement, the camera 21 and the connector 20 do not translate relative to the receiver 30. For example, camera 21 and connector 20 do not move along axis 60 relative to receiver 30, nor do they move in a direction perpendicular to axis 60.

Figure 6:
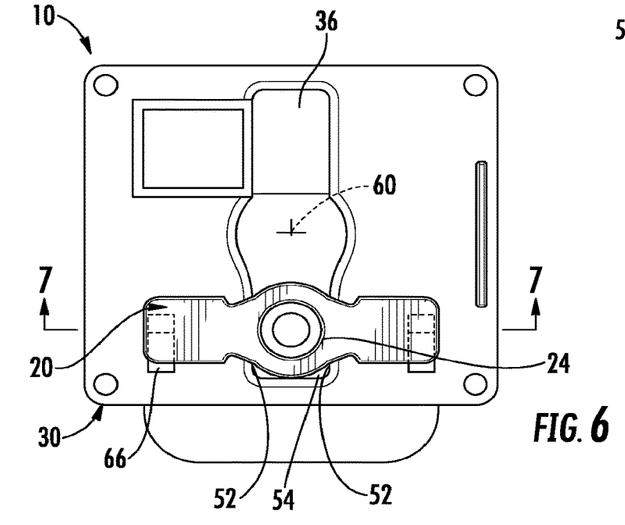
FIG. 6 is a view similar to FIG. 4 illustrating the example embodiment of the parts of the coupling in a mounted position according to various aspects of the present disclosure.

When the ninety degrees of rotation is finished (FIG. 5), the connector 20 is thereafter moved along the slot receiver 30. Specifically, the assembled camera 21 and connector 20 are translated relative to the receiver 30, via sliding movement in a direction perpendicular and downward from the direction indicated by the arrow 62 in FIG. 1. This sliding movement can occur in only one direction, because the block 42 inside the receiver 30 engages the crossbar 26 to prevent sliding movement of the connector 20 in the opposite direction. A sliding movement of a post may occur, as illustrated in FIGS. 5-6, from a center location of a slot in which the post is initially provided, to a second location in the slot in which the post is not initially received upon insertion into the receiver.

As such, a block or other physical structure may prevent both a rotational and lateral movement of a connector relative to a receiver. For example, block 42 prevents a lateral movement of a connector within a slot 54. The movement may be prevented based on a location of the block. The movement may also be prevented based on a shape of the connector. The movement may also be prevented based on an orientation of a portion of a connector relative to a location of the block. An orientation of a portion of a connector may depend on a rotation of the connector and the portion of the connector, such that lateral translation of the connector may be permitted when the connector is rotated to a first angle of rotation and has a first orientation relative to the block, but prevented when the connector is rotated to a different, second angle of rotation and has a second, different orientation relative to the block. Movement within a slot may be prevented along at least half of a length of the slot. Moving the post may be permitted along at least a half of the slot not precluded by the location and size of the block or other physical structure on the receiver. Movement within a slot may be prevented along the slot in a first direction relative to a center point of a slot, but permitted in a different direction along this slot relative the center point of the slot. The first and second directions may be diametrically opposite directions. The prevented direction of movement may be different from a direction at which the post frictionally engages other parts of the receiver. The slot may be sized to receive the post in the precluded direction, but lateral movement in this direction is prevented by the block. Instead, a post may only be able to translate between a center of a slot and an end of the slot. A post may be able to move a maximum distance between a first location and a second location within a slot, but this distance is less than a maximum length of the slot, as at least one of the first and second locations is not at an end of the slot. The other location, not at the end of the slot, may be a location at which the post enters an entry opening and a slot after the crossbar has also entered the entry opening and the slot.

A block may have a generally rectangular width and height, such as shown in FIG. 4. However, other shapes may be employed including those that provide at least two different contact surfaces for engaging a connector within a rotational range of motion of the conductor.

For example, post 24 of the connector 20 slides along the slot 54 between the two slot walls 52, in a direction away from a center of the entry opening 40 at axis 60. Sliding in the opposite direction in the slot is prevented by block 42. At the same time, the crossbar 26 of the connector 20 moves between the two wall panels 32 and 34 of the receiver 30, within the receiver chamber 36 but not within the slot 54. The crossbar is on an opposite side of a panel wall compared to a position of a base of the connector in this example embodiment. The relative dimensions of the slot 54 and of the connector post 24 are selected to cause light frictional engagement between the post and the slot walls 52.

Frictionally engaged components may be held in a position relative to each other based on a frictional force. A frictional force may exist between surfaces of two components. A frictional force between two surfaces may resist relative movement of the two surfaces upon application of a force to either component. The applied force which may be resisted may be at least as strong as gravity, such that coupled surfaces may be oriented in various directions and yet resist different forces that may be present in an environment. For example, two coupled components may be inverted relative to a direction at which the two components engage each other, such that gravity does not cause the components to become separated or otherwise move relative to each other. A force by which two components may be engaged may also be substantially greater than gravity, such that the two components may be struck or otherwise encounter forces that may be provided in an environment, particularly in an active environment in which an item is mounted to a sheet of material that is part of an article of clothing. Other extents, manners, or degrees of frictional engagement may also be included in embodiments according to various aspects of the present disclosure.

Figure 7:
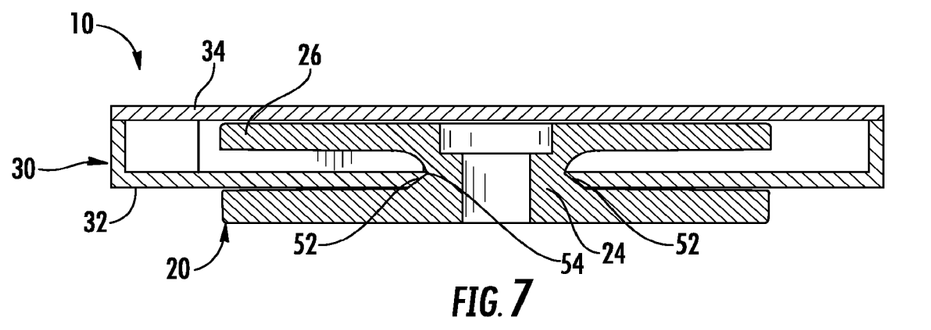
FIG. 7 is a schematic sectional view of an example embodiment of an engaged connector and receiver taken generally along line 7~7 of FIG. 6 according to various aspects of the present disclosure.

In embodiments, a part of the receiver that frictionally engages a post connector may include a wall of a slot. For example, a shape of a wall of a slot may be selected to engage a surface of the post of the connector at a specific orientation. The wall may have a surface along the slot that has a predetermined angle relative to a surface or surfaces of an outer wall panel of the receiver. For example, as shown in FIG. 7, left wall 52 has a flat shape and cross section at a location at which it engages post 24. The flat shape extends at an angle from an outer surface of outer wall panel 32 to an inner surface of the outer wall panel 32 inside recess 36. An angle of the wall between the wall and an inner surface of an outer wall panel may be acute, less than sixty degrees, less than forty-five degrees, and/or less than thirty degrees. In the example embodiment of FIG. 7, an angle of surface of wall 52 is at an angle less than forty-five degrees relative to a plane of an inner surface of outer wall panel 32. Another wall on an opposite side of the slot may also have a specific shape, enabling a different surface of the post to concurrently engage a different surface on a different, second wall of the slot. A post at each surface may include a surface shaped to match a surface of the slot wall along a length of the slot wall. For example, post 24 includes two linear surfaces as shown in FIG. 7. The linear surfaces are selected and positioned to respectively abut each of two slot walls, thereby frictionally engaging the slot on at least the two linear surfaces. In some embodiments, a surface of each of the slot and post may be chamfered or at least partially chamfered in a complementary manner, such that tight mechanical engagement may be achieved between the slot and the post. Different surface shapes and/or angular orientations for the slot walls and/or post may also be included in embodiments according to various aspects of the present disclosure.

A length of a post may also be selected to reduce movement of the connector upon receipt through the slot. For example, a length of the post may be equal or substantially equal to a thickness of a recessed chamber and an outer panel wall. Such an arrangement, in combination with a width of a crossbar, reduces a rotational force that may be applied to a post. Such lengths also minimize an extent to which a part of the connector opposite a crossbar may extend above a receiver upon being engaged with the receiver.

Related, a thickness of a crossbar may also be selected to minimize or prevent or resist rotational forces applied to a post. For example, a thickness of a crossbar, shown in the vertical direction of FIG. 7, may be at least half a thickness of a space between an inner and outer wall of a receiver in which the crossbar may be received. A thickness of a crossbar may alternately or additionally be substantially equal to a depth of a space available in the receiver behind an outer wall panel in which a slot is provided. A thickness of a crossbar may be slightly less than a thickness of a space behind an outer wall panel, thereby permitting the crossbar to move freely in the chamber, but limiting a space or range in which a crossbar may rotate toward a wall panel of the receiver.

Connector post 24 moves along the slot 54 until the connector post reaches the far end of the slot 54. Particularly, lateral movement of the connector 40 in the slot 54 may end when the post 24 engages wall 52 at an end of the slot 54. At this point, post 24 may engage parts on the receiver that include side and end walls 52 of the slot 54. At that point also, the crossbar 26 engages two wedges 66 at the far end of the slot 54, and the connector 20 "locks" in position in the receiver 30.

A wedge is an example surface structure that protrudes from a surface of the receiver. An angle of a surface of the wedge may be selected and the surface may be oriented to apply an increasing force to a crossbar as the crossbar slides along the surface of the wedge. The force applied is at least partially perpendicular to the direction at which the crossbar slides along the receiver, thereby serving as a holding force to hold the crossbar at a position on the receiver corresponding to the location of the surface structure. Other surface structures aside from wedges may be used to apply a holding force to a surface of the crossbar, including those that are recessed into a surface of a receiver or extend with a different shape from a surface of the receiver. The surface structures may be provided adjacent and/or in line with an end of a slot to which a post of a connector may be slid, such as generally illustrated in FIG. 6. Two wedges 66 are shown in FIGS. 3-5, though fewer or additional surface structures may be disposed on the receiver, including those that are provided at different relative locations on a surface of the receiver.

The connector 20 and the receiver 30 are in a mounted position as shown in FIG. 6. In an alternative construction, the receiver 30 may include one or more detents (not shown) along the slot 54. Movement of the connector post 24 along the slot 54 would cause the detent(s) to be engaged and then passed as the connector moves into the mounted position. The detent(s) would resist movement of the connector out of the mounted position.

When the connector 20 is thus in the mounted position, the engagement of the post 24 with the slot walls 52 resists sliding movement of the connector 20 out of the mounted position, in a direction back along the slot 54 toward a center of the entry opening 40. Resistance to sliding movement from this mounted position may be provided by engagement between walls of the slot and the post of the connector and/or between surface structures of the receiver and the crossbar. Either or both engagements may rely in whole or in part on frictional forces between respective elements. The position of the crossbar 26 between the two wall panels 52 and 54 of the receiver 30 blocks movement of the crossbar out of the receiver chamber 36. Particularly, a positioning of a crossbar behind a wall panel on which a slot is provided blocks movement of the crossbar out of slot via an entry opening in communication with the slot. As a result, the assembled connector 20 and camera 21 are securely connected to the receiver 30 and to the mount point 31.

At this mounting position, a post is located at an end of a slot. For example, post 24 is located at a lower end of slot 54 as illustrated in FIG. 6. As illustrated in FIG. 4, this same end of the slot previously received crossbar 26, but not the post 24. After rotation of the connector 20, the end of the slot opposite a location of the block 32 receives and engages with the post 24. As such, a location in a slot may separately receive a crossbar and a post in embodiments according to various aspects of the present disclosure. A portion of a slot, such as half of a slot or less than all of a slot, may be sized to separately receive a crossbar and a post in embodiments according to various aspects of the present disclosure. A shape of the slot permits both a crossbar and a post to be received at a location in the slot. The slot has a width that is sized to separately receive both the crossbar and the post. A width of the slot permits a crossbar to pass through the slot at a location, as well as subsequently engage a post both in and through the slot at this location. A portion of the crossbar received at this location may be located away from a position on the crossbar at which the crossbar is integrated with the post. A portion of the crossbar received at the location is not immediately physically coupled with the post.

Removal (disconnection) of the camera 21 from the mount point 31 is basically the reverse of the connection operation. The connector 20 is moved relative to the receiver 30 so that the connector post 24 slides along the slot 54 from the mounted position toward the entry opening 40, and is stopped at the entry opening by engagement with the block 42. Thereafter, at the location of the entry opening 40, the camera 21 and connector 20 are rotated ninety degrees about the axis 60, causing the crossbar 26 to rotate ninety degrees between the wall panels 32 and 34 of the receiver 30. The crossbar 26 can then be removed from (pulled out from) the receiver 30 via the entry opening 40. The assembled connector 20 and camera 21 are thus disconnected from the receiver 30 and the mount point 31.

In sum, movement of the camera 21 (and its assembled connector 20) in three distinct degrees of motion (slide then rotate then pull) is needed, to disconnect the camera from the mount point 31 and the receiver 30. This feature enhances reliability and safety, keeping the camera 21 securely connected to the mount point 31 unless there is deliberate, controlled action in several different directions to disconnect them, Thereafter, the connector 20 can easily be mounted on the receiver 30 again. Alternatively, the connector 20 can be connected with other, similar receivers on a docking station, on a charging station for video download, on a uniform or a vehicle, etc. This standardized arrangement enhances the commercial usefulness of the coupling 10.

While the provided example embodiments involve a connector on the item to be mounted and a receiver is on a mount point, such pairings may also be reversed in aspects of the present disclosure. For example, a body camera may include a receiver and each of one or more mount points may include a connector. Such alternate pairings may also involve items that are not body cameras, such as portable electronic devices, weapons, and other equipment, particularly that which may be employed by a law enforcement officer or in a law enforcement environment.

The foregoing description discusses embodiments, which may be changed or modified without departing from the scope of the invention as defined in the claims. For example, certain components or relationships between components may be excluded from some embodiments or optionally included in some embodiments. A component or relative arrangement of components may be provided independent of another component or relative arrangement of any such component. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, specific embodiments of the invention have been described, the scope of the invention is intended to be measured by the claims as set forth below. In the claims, the term "provided" is used to definitively identify an object that is not a claimed element of the invention but an object that performs the function of a workpiece that cooperates with the claimed invention. For example, in the claim "an apparatus for aiming a provided barrel, the apparatus comprising, "a housing, the barrel positioned in the housing", the barrel is not a claimed element of the apparatus, but an object that cooperates with the "housing" of the "apparatus" by being positioned in the "housing". The location indicators "herein", "hereunder", "above", "below", or other words that refer to a location, whether specific or general, in the specification shall be construed to refer to any location in the specification where the location is before or after the location indicator.

What is claimed is:

1. A coupling for releasably securing a body camera to a mount point, comprising a connector that is fixed on the body camera, and a receiver that is fixed on the mount point;
   the connector having a generally T-shaped configuration including a post and a crossbar;
   the receiver having an entry opening, a receiver chamber, a slot, and a block positioned at a location adjacent to the slot; and
   the connector being engageable with the receiver by moving the crossbar though the entry opening and into the receiver chamber, rotating the connector relative to the receiver, and moving the post along the slot to frictionally engage parts on the receiver and hold the connector in a mounted position on the receiver, wherein the block is configured to engage the connector in a first rotational direction, thereby preventing rotation of the connector in the first rotational direction after the crossbar is moved through the entry opening.

2. The coupling of claim 1, wherein the block is configured to prevent rotation of the connector in a second rotational direction beyond a predetermined angle of rotation.

3. The coupling of claim 2, wherein the block is configured to prevent a lateral movement of the connector within the slot in a direction different from a direction in which the post is moveable along the slot to frictionally engage the parts on the receiver.

4. The coupling of claim 1, wherein the block is positioned inside the receiver chamber.

5. The coupling of claim 1, wherein the parts of the receiver include a wall of the slot.

6. The coupling of claim 1, wherein a surface of the receiver includes at least one surface structure, each surface structure disposed at a respective location on the surface of the receiver, the respective location of each surface structure selected to engage the crossbar and thereby hold the connector to the receiver.

7. The coupling of claim 1, wherein a direction in which the post is configured to move along the slot is perpendicular to a direction at which the crossbar is configured to move through the entry opening to engage the connector with the receiver.

8. The coupling system of claim 1, wherein the mount point is one of an officer's uniform and a docking station.

9. The coupling of claim 1, wherein:
   the receiver further includes a wedge; and
   upon moving the post along the slot to frictionally engage parts on the receiver, the wedge is configured to slideably engage the crossbar.

10. A coupling system, comprising:
    a body camera;
    a mount point;
    a connector fixed to one of the body camera and the mount point; and
    a receiver fixed to the other of the body camera and the mount point, wherein:
    the connector includes a post and a crossbar;
    the receiver includes an entry opening in communication with a slot and a physical structure positioned on the receiver; and
    the connector is configured to engage with the receiver by moving the crossbar though the entry opening, rotating the connector relative to the receiver, and moving the post along the slot to engage the receiver and to hold the connector in a mounted position on the receiver, wherein the physical structure positioned on the receiver is configured to limit a direction of rotation of the crossbar.

11. The coupling system of claim 10 wherein the crossbar includes a thin plate that extends perpendicular to a length of the post in two diametrically opposite directions from the post.

12. The coupling system of claim 10, wherein the receiver includes outer and inner wall panels and the crossbar is engageable with the receiver between the outer and inner wall panels.

13. The coupling system of claim 12, wherein the outer and inner wall panels are positioned on the receiver parallel to each other.

14. The coupling system of claim 12, wherein the entry opening and the slot are provided on the outer wall panel of the receiver.

15. The coupling system of claim 10, wherein the physical structure is positioned to prevent a lateral movement of the connector relative to the receiver.

16. The coupling system of claim 10, wherein the physical structure is positioned to limit an angle to which the crossbar may be rotated in the limited direction of rotation.

17. The coupling system of claim 10, wherein a portion of the slot is sized to separately receive both the crossbar and the post.

18. The coupling system of claim 10, wherein the receiver further includes a wedge configured to frictionally engage the crossbar to provide a holding force to hold the crossbar at a position on the receiver corresponding to the location of the wedge.

19. A method of releasably securing a body camera to a mount point using a connector that is fixed on the body camera and a receiver that is fixed on the mount point, the connector including a post and a crossbar, the receiver including an entry opening, a slot, and a physical structure positioned on the receiver, the method comprising:
    moving the crossbar of the connector through the entry opening to engage the receiver,
    rotating the connector relative to the receiver after the crossbar is moved through the entry opening, wherein the physical structure positioned on the receiver is configured to limit a direction of rotation of the crossbar; and
    after rotating the connector, moving the post along the slot to engage the receiver and hold the connector in a mounted position on the receiver, thereby securing the body camera to the mount point.

20. The method of claim 19, wherein moving the post along the slot comprises moving the post from a first location in the slot at which the post enters the slot to a second location in the slot at an end of the slot.

* * * * *